D. SMITH, C. C. & J. C. MARSHALL.
EXTRACTORS FOR REVOLVING FIRE-ARMS.
No. 176,412. Patented April 18, 1876.
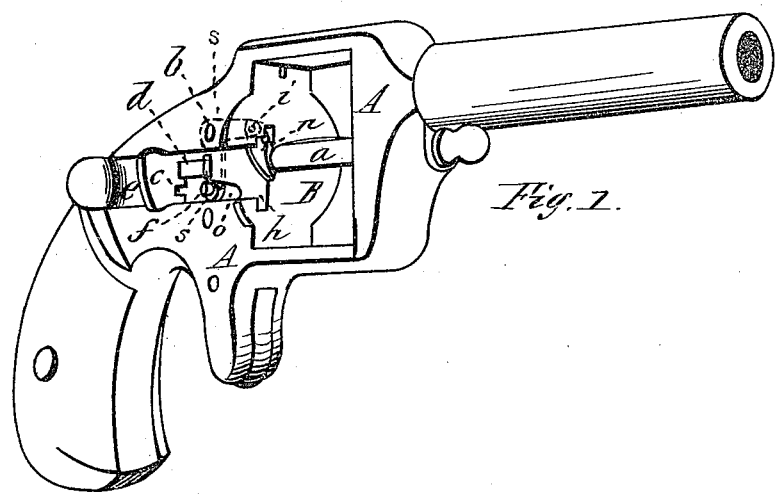
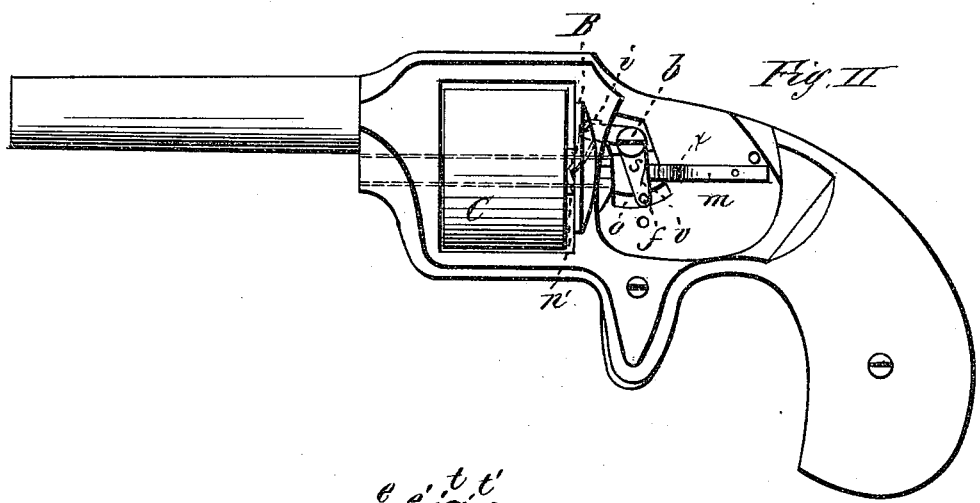
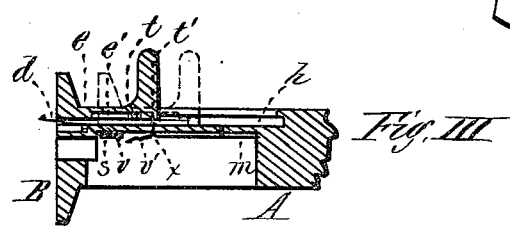
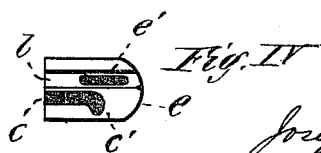
Witnesses,
C. E. Buckland.
D. E. Fisk.
Inventor,
Dexter Smith.
Joseph C. Marshall.
Charles C. Marshall.

UNITED STATES PATENT OFFICE.

DEXTER SMITH, CHARLES C. MARSHALL, AND JOSEPH C. MARSHALL, OF SPRINGFIELD, MASSACHUSETTS.

IMPROVEMENT IN EXTRACTORS FOR REVOLVING FIRE-ARMS.

Specification forming part of Letters Patent No. 176,412, dated April 18, 1876; application filed January 17, 1876.

*To all whom it may concern:*

Be it known that we, DEXTER SMITH, CHARLES C. MARSHALL, and JOSEPH C. MARSHALL, all of Springfield, in the State of Massachusetts, have invented a new and useful Improvement in Revolving Fire-Arms; and that the following is a full, clear, and exact description thereof, reference being had to the accompanying drawings, making a part of this description and specification, and to the letters of reference marked thereon.

The object of our invention is to extract the shells or cartridges, one at a time, from the rear end of the chambers of a revolving fire-arm, and to revolve the cylinder for that purpose at one and the same movement of the extracting mechanism; and to this end our invention consists of a bent lever or crank, pivoted to the frame in the rear of the recoil-shield, and an extractor, both operated by a slide, so that the extractor is moved up against the rear end of the cylinder, and the latter rotated to bring the heads of all the shells successively into position behind the extractor-hook, and the shells extracted in rapid succession as fast as the cylinder is rotated, as will be more fully hereinafter described.

Figure I is a perspective view of a revolving fire-arm having our invention applied. Fig. II is a side view of the same with the lock-plate removed. Fig. III is a horizontal section of that part of the arm to which our invention is applied; and Fig. IV is a side view, showing the inside of the slide.

In the drawing, A represents the frame of a revolving fire-arm, in the side of which is made a recess, $h$, in which is fitted, to move freely, the slide $e$, which is provided with a groove, $b$, to receive, and in which moves to and fro, the extractor. The slide is also recessed in said groove at $e'$, into which protrudes a small pin or projection upon the extractor; and the slide is also provided with another recess, $c$, the rear part of which turns downward at $c'$. The extractor $d$ is placed in the groove $l$ of the slide $e$, and a pin or projection, $t$, upon the extractor protrudes into the elongated recess $e'$, and the extractor is also provided with a notch or indent, $t'$, as shown in Fig. III. A spring, $m$, is secured to the inside of the frame A, and is provided with a projection, $x$, which protrudes through the frame and into the notch or indent $t'$ in the extractor, as shown in Fig. III; and the spring is also provided with an indent, $v'$, and the extreme end of the spring is turned outward a little, so that the vertical arm of the pivoted lever $s$, when thrown backward, may pass in behind the spring and force it outward; and that part of the lever $s$ is provided with a small projection, $v$, which fits into the indent $v'$ when the vertical arm of the lever is thrown back. The lever $s$ has an arm extending forward in a horizontal direction, from the pivot $b$ to a point in the recoil-shield just in rear of the ratchet-teeth upon the rear end of the cylinder; and to the end of this arm may be pivoted a dog, $n$, to engage with the ratchet-teeth on the rear end of the cylinder; or the dog may be omitted, and the front end of the lever itself engage with the ratchet-teeth, the hole in the lever being elongated, through which the pivot $b$ passes, with a spring forcing the lever forward, to allow the lever to move back in moving over the teeth.

The operation of our invention is as follows: Cartridges being placed in the chambers C at the rear end, the slide $e$ is moved forward, by which movement the rear end of the recess $c'$ strikes against the pin or projection $t$ on the extractor $d$, and the latter is moved forward until the small hook on its extreme end is in its position against the rear end of the cylinder; and when the extractor is in this position the little detent or point $x$ upon the spring $m$, which protrudes through the frame, drops into the notch $t'$ in the side of the extractor, and holds it in that position against the rear end of the cylinder. At the forward movement of the slide the projection $f$ on the lower end of the lever $s$ enters the recess $c$, the rear part, $c'$, of which carries the vertical arm of said lever forward, and raises the horizontal arm and dog $n$, pivoted thereto, until the latter engages with the next tooth on the cylinder. When the slide $e$ is moved backward, the vertical part $c'$ of the recess $c$ in the slide, in which is the projection $f$, carries the vertical arm of the lever back, forcing down the horizontal arm, and rotating the cylinder until a shell or cartridge-head is brought into position with its flange behind the hook of the extractor. When this has occurred, the lever s, passing in behind the extreme forward end of the spring m, forces it outward, releasing the little point x from the notch t' in the extractor, and at this backward movement of the lever s the small vertical projection v upon the side of the said lever drops into the notch v' in the forward end of the spring m. As the slide is continued to be moved back, it now moves the extractor rearward by the contact of the front end of the recess e' against the projection t upon the extractor, drawing the shell, which drops out of the way as soon as it clears the chamber of the cylinder. As the slide is again moved forward, the lever s being held stationary, the projection f thereon will enter the recess c readily, and when the rear part c' of said recess strikes the projection, the lever is carried forward, forcing the part v out of the notch v' in the spring m, and the latter is then ready to operate against the extractor and hold that in position while the cylinder is rotated to bring another shell into position behind the extractor-hook, as before.

It is obvious that the piece e, employed to operate the extractor and the lever s, may be arranged to swing upon a pivot, instead of sliding, without departing from the principle of its operation.

Having described our invention, what we claim as new is—

1. A revolving fire-arm in which the chambered cylinder is or may be rotated and the extractor operated by means of a movable piece placed in the rear of the revolving cylinder, substantially as described.

2. The combination of the slide e, the extractor d, the spring m, and the pivoted lever s, all substantially as and for the purpose described.

3. In combination with the frame A, the spring m and the extractor d, whereby the said extractor is held in place against the rear end of the cylinder while the latter is being revolved to bring each shell into position to be extracted, substantially as described.

DEXTER SMITH.
CHARLES C. MARSHALL.
JOSEPH C. MARSHALL.

Witnesses:
T. A. CURTIS,
C. E. BUCKLAND.